(12) United States Patent
Zhao et al.

(10) Patent No.: US 12,136,741 B2
(45) Date of Patent: Nov. 5, 2024

(54) CASING OF BATTERY, BATTERY AND ELECTRICITY-CONSUMING APPARATUS

(71) Applicant: CONTEMPORARY AMPEREX TECHNOLOGY (HONG KONG) LIMITED, Hong Kong (CN)

(72) Inventors: Pengbo Zhao, Fujian (CN); Yong Wang, Fujian (CN); Qing Wang, Fujian (CN); Pengcheng Yao, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/734,350

(22) Filed: Jun. 5, 2024

(65) Prior Publication Data
US 2024/0322336 A1    Sep. 26, 2024

Related U.S. Application Data

(63) Continuation of application No. PCT/CN2023/075606, filed on Feb. 13, 2023.

(30) Foreign Application Priority Data

Mar. 23, 2022    (CN) .......................... 202210285589.9

(51) Int. Cl.
*H01M 50/244*    (2021.01)
*H01M 50/236*    (2021.01)
(Continued)

(52) U.S. Cl.
CPC ....... *H01M 50/244* (2021.01); *H01M 50/236* (2021.01); *H01M 50/249* (2021.01); *H01M 50/258* (2021.01)

(58) Field of Classification Search
CPC . H01M 50/244; H01M 50/249; H01M 50/258
See application file for complete search history.

(56) References Cited

U.S. PATENT DOCUMENTS

2022/0209346 A1*  6/2022  Yao ..................... H01M 50/244

FOREIGN PATENT DOCUMENTS

| CN | 203756680 U | 8/2014 |
|----|-------------|--------|
| CN | 108167549 A | 6/2018 |

(Continued)

OTHER PUBLICATIONS

Notification of Grant for Chinese Patent Application 202210285589.9, mailed Apr. 29, 2022.

(Continued)

*Primary Examiner* — Jonathan G Jelsma
(74) *Attorney, Agent, or Firm* — WOMBLE BOND DICKINSON (US) LLP

(57) ABSTRACT

A casing of a battery, a battery and an electricity-consuming apparatus are provided by the present application. The casing of the battery includes a first beam, a second beam and a connecting assembly. A surface of the first beam is provided with a groove. The second beam is arranged on a side of the first beam provided with the groove. The first beam and the second beam is configured to limit a space for accommodating a battery cell. The connecting assembly is configured to connect the first beam with the second beam. At least a portion of the connecting assembly is arranged inside the first beam and the second beam.

20 Claims, 8 Drawing Sheets

(51) Int. Cl.
*H01M 50/249* (2021.01)
*H01M 50/258* (2021.01)

(56) References Cited

FOREIGN PATENT DOCUMENTS

| | | |
|---|---|---|
| CN | 108461685 A | 8/2018 |
| CN | 208522250 U | 2/2019 |
| CN | 109417137 A | 3/2019 |
| CN | 110021720 A | 7/2019 |
| CN | 210467949 U | 5/2020 |
| CN | 112673180 A | 4/2021 |
| CN | 214171025 U | 9/2021 |
| CN | 214957111 U | 11/2021 |
| CN | 215578820 U | 1/2022 |
| CN | 216085131 U | 3/2022 |
| CN | 114388958 A | 4/2022 |
| CN | 114982046 A | 8/2022 |
| DE | 202012010584 U1 | 3/2014 |
| TW | 435842 U | 5/2001 |

OTHER PUBLICATIONS

International Search Report for Application PCT/CN2023/075606, mailed Apr. 30, 2023.

\* cited by examiner

CASING OF BATTERY, BATTERY AND ELECTRICITY-CONSUMING APPARATUS

CROSS REFERENCE TO RELATED APPLICATION

This application is a continuation of International Application No. PCT/CN2023/075606, filed on Feb. 13, 2023, which claims priority to Chinese Patent Application No. 202210285589.9, filed on Mar. 23, 2022. The disclosures of the aforementioned applications are hereby incorporated by reference in their entireties.

TECHNICAL FIELD

The present application relates to the technical field of batteries, and in particular to a casing of a battery, a battery and an electricity-consuming apparatus.

BACKGROUND

Generally, a structure of a casing of a battery includes several boundary beams and crossbeams. Among them, each two boundary beams or one boundary beam and one crossbeam are welded and fixed, or connected through a support member and a connecting member. The support member is usually connected to an outer peripheral surface of an end of the crossbeam or boundary beam through the connecting member, and connected to an outer peripheral surface of an end of another boundary beam or an outer peripheral surface of a middle region of another boundary beam through the connecting member.

In the actual production and use process, it was found that both the connection methods between two boundary beams and between the boundary beam and the crossbeam have the problem of the low connection strength, which needs to be further solved.

SUMMARY

The present application provides a casing of a battery, a battery and an electricity-consuming apparatus, which can effectively improve the connection strength between two boundary beams or between the boundary beam and the crossbeam.

In a first aspect, embodiments of the present application provide a casing of a battery, including a first beam, a second beam and a connecting assembly. A surface of the first beam is provided with a groove. The second beam is arranged on a side of the first beam provided with the groove. The first beam and the second beam are configured to define a space for accommodating a battery cell. The connecting assembly is configured to connect the first beam with the second beam, and at least a portion of the connecting assembly is arranged inside the first beam and the second beam.

In the above solution, the first beam and the second beam are connected through the connecting assembly, and at least a portion of the connecting assembly is arranged inside the first beam and the second beam and connects the first beam with the second beam. When subjected to an external force, the portion of the connecting assembly located inside the first beam and the second beam is subjected to the force as a whole, so that it can withstand the relatively large external force. Furthermore, the first beam and the second beam provide the support for the connecting assembly by covering the portion of the connecting assembly inside the first beam and the second beam. The first beam and the second beam can share a portion of the external force acting on the connecting assembly, so as to allow the connection between the first beam and the second beam to withstand a larger external force, improve the connection strength between the first beam and the second beam, and enhance the structural strength of the casing of the battery.

In some embodiments, the connecting assembly includes a first connecting member and a second connecting member. The first connecting member includes a first portion and a second portion. The second portion extends from a surface of the first portion towards a direction away from the first portion. The first portion is connected to the first beam through the second connecting member. At least a portion of the second connecting member is accommodated in the groove. The second portion is connected to the second beam through the second connecting member.

In the above solution, the first portion of the first connecting member is arranged inside the first beam or in the groove. The second connecting member penetrates through a bottom of the groove and positions the first portion inside the first beam or inside a first groove. The second portion is arranged inside the second beam. The second connecting member positions the second portion inside the second beam. A side wall of the first beam or a groove wall and a bottom of the groove can cover and support the first portion, and a side wall of the second beam can cover and support the second portion, so as to share the external force acting on the first portion and the second portion.

In some embodiments, the first portion is accommodated within the groove, and fixed at the bottom of the groove through the second connecting member.

In the above solution, the first portion is mounted and fixed in the groove, which has the advantage of easy disassembly and assembly and is more suitable for the connection between the boundary beam and the crossbeam.

In some embodiments, the first portion is provided with a concave portion on a surface of the concave portion facing away from the first beam, and at least a portion of the second connecting member is accommodated within the concave portion.

In the above solution, by providing the concave portion on the surface of the first portion facing away from the first beam, the weight of the first portion can be reduced and the requirement of lightweight can be achieved.

In some embodiments, the second portion includes at least one connecting end for inserting into an interior of the corresponding second beam, and in a state of the second portion including a plurality of connecting ends, the connecting ends are parallel with and spaced apart from one another.

In the above solution, the second portion includes at least one connecting end, which can be engaged with the second beam with different shaped cavities. When there are a plurality of connecting ends, the connecting ends are inserted into a plurality of shaped cavities of the second beam, respectively, which can further increase the area of the second beam covering onto the second portion. In addition, each of the connecting ends needs to be connected to the second beam, so as to further improve the ability of the second portion withstanding the external force, improve the connection strength between the second beam and the second portion, and improve the connection strength between the first beam and the second beam.

In some embodiments, the first connecting member further includes a third portion, which is connected to the second portion and configured to connect with a region other than the groove on the surface of the first beam provided with the groove.

In the above solution, by connecting the third portion with the first beam, the connection strength between the first connecting member and the first beam can be further improved, so that the connection strength between the first beam and the second beam can be improved.

In some embodiments, a size of the first portion in a depth direction of the groove is less than or equal to a depth of the groove.

In the above solution, the first portion does not protrude from a groove opening of the groove when is arranged inside the groove, so as to avoid occupying an internal space of the casing.

In some embodiments, the first portion is accommodated within the first beam, and the second connecting member passes through the bottom of the groove and is connected to the first portion.

In the above solution, the first portion is mounted and fixed in the first beam. The connection strength between the first beam and the first portion can be improved by the first beam covering the first portion, which is more suitable for the connection between the boundary beams.

In some embodiments, each of the first portion and the second portion includes at least one inserting end, which is configured to insert into an interior of the corresponding first beam or second beam; in a state of the first portion including a plurality of inserting ends, the inserting ends of the first portion are parallel with and spaced apart from one another; and in a state the second portion including a plurality of inserting ends, the inserting ends of the second portion are parallel with and spaced apart from one another.

In the above solution, each of the first portion and the second portion includes at least one inserting end, which can be engaged with the first beam and the second beam with different shaped cavities. When the first portion and the second portion each include a plurality of inserting ends, the inserting ends are inserted into a plurality of shaped cavities of the first beam and a plurality of shaped cavities of the second beam, respectively, which can further increase the area of the first beam covering onto the first portion and the area of the second beam covering onto the second portion. In addition, the connecting ends need to be connected to the first beam and the second beam, respectively, so as to further improve the ability of the first portion and the second portion to withstand the external force, improve the connection strengths between the first beam and the first portion and between the second beam and the second portion, and thus improve the connection strength between the first beam and the second beam.

In some embodiments, the first connecting member is in a folding angular structure, and an angle formed between the first portion and the second portion is larger than 0° and less than 180°.

In the above solution, by selecting the first connecting members with different angles between the first portion and second portion, the connections between the first beam and the second beam at different angles can be achieved.

In some embodiments, the first connecting member is provided with a plurality of shaped recesses for reducing a weight of the first connecting member.

In the above solution, by providing the shaped recesses, the weight of the casing of the battery, the battery and the electricity-consuming apparatus can be effectively reduced, and the lightweight requirement can be achieved.

In some embodiments, the casing includes two first beams and two second beams, which are arranged alternately to form a frame structure. The first beam and the second beam which are adjacent are connected through the connecting assembly.

In the above solution, both the first beam and the second beam can be understood as the boundary beams, and the first portion and second portion of the first connecting member are arranged inside the first beam and the second beam, respectively.

In some embodiments, the casing includes a plurality of first beams, which are sequentially connected to form a frame structure. The second beam is arranged within the frame structure and connected to two first beams through the connecting assembly.

In the above solution, the first beam can be understood as the boundary beam, and the second beam can be understood as the crossbeam. The first portion of the first connecting member is arranged in the groove of the first beam, and the second portion of the first connecting member is arranged inside the second beam.

In a second aspect, embodiments of the present application provide a battery. The battery includes a battery cell and the casing of the battery according to any one of the embodiments in the first aspect. The casing of the battery is configured to accommodate the battery cell.

In the above solution, the first beam and the second beam of the casing of the battery are connected through the connecting assembly, and at least a portion of the connecting assembly is arranged inside the first beam and the second beam and connects the first beam with the second beam. When subjected to an external force, the portion of the connecting assembly located inside the first beam and the second beam is subjected to the force as a whole, so that it can withstand a relatively large external force. Furthermore, the first beam and the second beam provide the support for the connecting assembly by covering the portion of the connecting assembly inside the first beam and the second beam. The first beam and the second beam can share a portion of the external force onto the connecting assembly, so as to allow a connecting place between the first beam and the second beam to withstand a larger external force, improve the connection strength between the first beam and the second beam, and enhance the structural strength of the casing of the battery and the battery.

In a third aspect, embodiments of the present application provide an electricity-consuming apparatus, which includes the battery according to any one of the embodiments in the second aspect. The battery is configured to supply electric power.

In the above solution, the first beam and the second beam of the casing of the battery are connected through the connecting assembly, and at least a portion of the connecting assembly is arranged inside the first beam and the second beam and connects the first beam with the second beam. When subjected to the external force, the portion of the connecting assembly located inside the first beam and the second beam is subjected to the force as a whole, so that it can withstand a relatively large external force. Furthermore, the first beam and the second beam provide the support for the connecting assembly by covering the portion of the connecting assembly inside the first beam and the second beam. The first beam and the second beam can share a portion of the external force acting on the connecting assembly so as to allow the connection between the first beam and the second beam to withstand a larger external force, improving the connection strength between the first beam and the second beam, and thus improving the structural strength of the casing of the battery, the battery and the electricity-consuming apparatus.

BRIEF DESCRIPTION OF THE DRAWINGS

In order to more clearly illustrate the technical solutions of the embodiments of the present application, the drawings to be used in the description of the embodiments of the present application will be described briefly below. For those skilled in the art, other drawings can also be obtained according to these drawings without the inventive labor.

Figure 1:
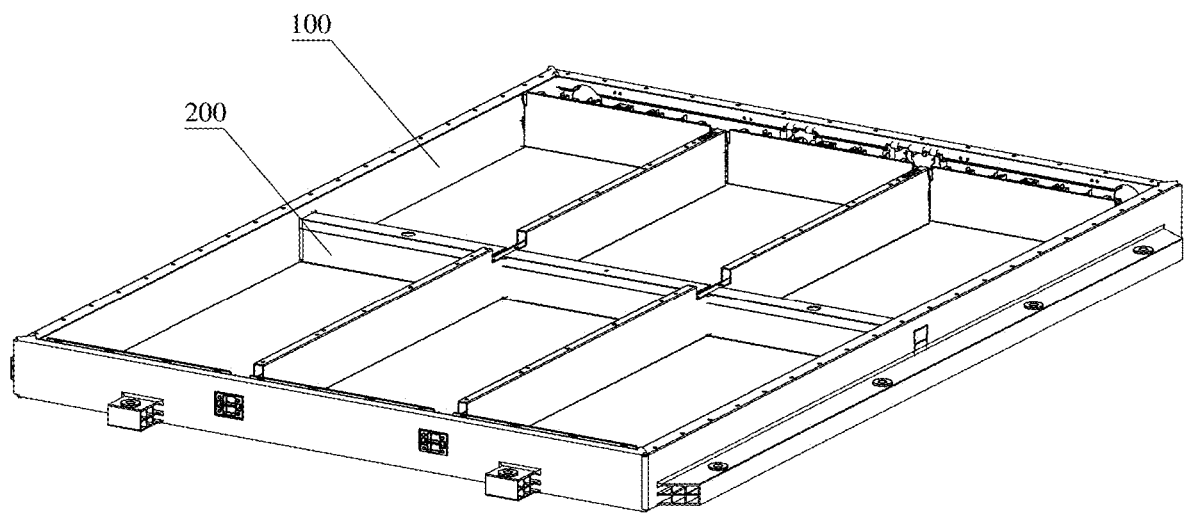
FIG. 1 shows a structural schematic view of a boundary beam and a crossbeam of a casing of a battery connected by welding in a related art.

In the drawings, the drawings are not drawn to actual scale.

DESCRIPTION OF REFERENCE NUMERALS

100—boundary beam; 200—crossbeam; 300—support member; 400—connecting member; 1—vehicle; 2—battery; 21—battery unit; 211—battery cell; 22—casing; 221—first casing portion; 222—second casing portion; 223—accommodating space; 224—first beam; 2241—groove; 2242—shaped cavity; 225—second beam; 2251—shaped cavity; 226—connecting assembly; 2261—first connecting member; 22611—first portion; 22612—second portion; 22613—third portion; 22614—inserting end; 22615—connecting end; 22616—concave portion; 22617—shaped recess; 2262—second connecting member; 3—controller; 4—motor; 5—battery module.

DETAILED DESCRIPTION

In order to make the objects, technical solutions and advantages of the embodiments of the present application more clear, the technical solutions of the embodiments of the present application will be clearly described below in conjunction with the drawings of the embodiments of the present application. It is apparent that the described embodiments are a portion of the embodiments of the present application, and not all of them. Based on the described embodiments of the present application, all other embodiments obtained by those skilled in the art without inventive labor fall within the scope of the present application.

Unless otherwise defined, technical terms or scientific terms used in the present disclosure should be interpreted according to common meanings thereof as commonly understood by those of ordinary skills in the art. The terms used in the description in the present application are only for the purpose of describing specific embodiments and are not intended to limit the present application. The terms "including" and "having" in the description and the claims of the present application and the above description of the drawings, and any variations thereof are intended to cover non-exclusive inclusions. The terms "first", "second", etc. in the description and the claims of the present application or the above-mentioned drawings are used to distinguish different objects, rather than to describe a specific order or a primary-secondary relationship.

The "embodiments" referred in the present application means that specific features, structures or characteristics described in conjunction with the embodiments may be included in at least one embodiment of the present application. This word appeared in various places in the description does not necessarily refer to the same embodiment, nor is it an independent or alternative embodiment mutually exclusive with other embodiments.

In the description of the present application, it should be noted that, unless otherwise clearly specified and limited, the terms "mount", "connecting" and "connection" and "attach" should be understood in a broad sense, for example, it can be a fixed connection, a detachable connection, or an integral connection, it can be connected directly, it can be connected indirectly through an intermedium, or it can be a communication between two elements at insides thereof. For those of ordinary skill in the art, the specific meaning of the above-mentioned terms in the present application can be understood according to specific situations.

The term "and/or" in the present application is merely an association relationship describing associated objects, which means that there can be three types of relationships. For example, "A and/or B" can mean three cases that there is only A, there are A and B at the same time, and there is only B. In addition, the punctuation mark "/" in the present application generally indicates that the related objects of the preceding content and following content are in an "or" relationship.

In the embodiments of the present application, the same reference numerals denote the same components, and for the sake of brevity, in different embodiments, detailed descriptions of the same components are omitted. It should be understood that the thickness, length, width and other sizes of the various components in the embodiments of the present application shown in the drawings, as well as the overall thickness, length and width, etc., of the integrated device are only exemplary descriptions, and should not constitute any limitation to the present application.

The "plurality" in the present application refers to two or more (including two).

In the present application, a battery cell may include a lithium-ion secondary battery cell, a lithium-ion primary battery cell, a lithium-sulfur battery cell, a sodium lithium ion battery cell, a sodium ion battery cell, a magnesium ion battery cell and the like, which is not limited in the embodiments of the present application. The battery cell can be in a shape of a cylinder, a flatten body, a cuboid or other shapes, which is not limited in the embodiments of the present application. Generally, the battery cell can be divided into three types in packaging: a cylindrical cell, a cuboid battery cell and soft pack battery cell, which is not limited in the embodiments of the present application.

The battery mentioned in the embodiments of the present application refers to a single physical module that includes one or more battery cells to provide higher voltage and capacity. The battery generally includes a casing for packaging one or more battery cells. The casing can prevent liquid or other foreign objects from affecting the electrical charge or the electrical discharge of the battery cell.

The battery cell includes an electrode assembly and an electrolyte, and the electrode assembly includes a positive electrode sheet, a negative electrode sheet and a separator. The battery cell mainly relies on the movement of metal ions between the positive electrode sheet and the negative electrode sheet to work. The positive electrode sheet includes a positive electrode current collector and a positive electrode active material layer applied on the surface of the positive electrode current collector. The positive electrode current collector includes a positive electrode current collecting portion and a positive electrode tab protruding from the positive electrode current collecting portion. The positive electrode current collecting portion is coated with the positive electrode active material layer, and at least a portion of the positive electrode tab is not coated with the positive electrode active material layer. Taking a lithium ion battery as an example, the material of the positive electrode current collector may be aluminum, and the positive electrode active material layer includes a positive electrode active material, which may be lithium cobaltate, lithium iron phosphate, ternary lithium, lithium manganite or the like. The negative electrode sheet includes a negative electrode current collector and a negative electrode active material layer applied on the surface of the negative electrode current collector. The negative electrode current collector includes a negative electrode current collecting portion and a negative electrode tab protruding from the negative electrode current collecting portion. The negative electrode current collecting portion is coated with the negative electrode active material layer, and at least a portion of the negative electrode tab is not coated with the negative electrode active material layer. The material of the negative electrode current collector may be copper, and the negative electrode active material layer includes a negative electrode active material, which may be carbon, silicon or the like. In order to ensure the high current passing through without fusing, a plurality of positive electrode tabs are stacked together, and a plurality of negative electrode tabs are stacked together. The material of the separator may be PP (polypropylene), PE (polyethylene) or the like. In addition, the electrode assembly may be a winding-type structure or a stack-type structure, which is not limited in the embodiments of the present application.

Figure 2:
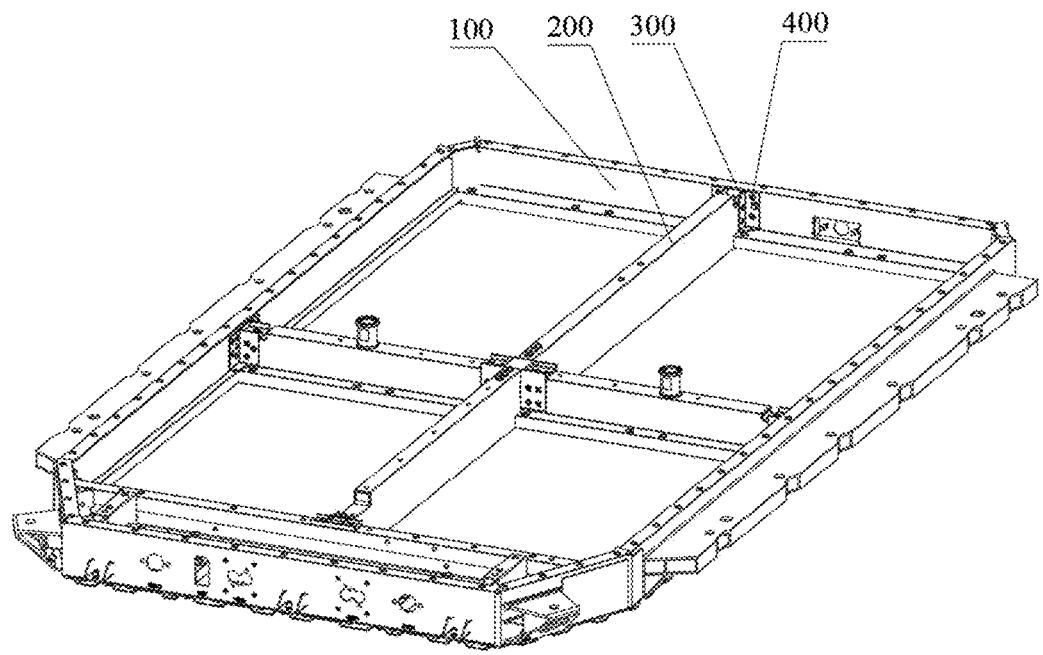
FIG. 2 shows a structural schematic view of a boundary beam and a crossbeam of a casing of a battery connected by a support member and a connecting member in a related art.

FIG. 1 shows a structural schematic view of a boundary beam and a crossbeam of a casing of a battery connected by welding in a related art; FIG. 2 shows a structural schematic view of a boundary beam and a crossbeam of a casing of a battery connected by a support member and a connecting member in a related art; and FIG. 3 shows a cross-sectional view of a boundary beam of a casing of a battery in a related art.

The inventor designs a casing including boundary beams 100 and crossbeams 200. Referring to FIG. 1, during a process of manufacturing the casing of the battery, the boundary beams 100 need to be welded to form a frame structure, and the crossbeams 200 need to be arranged inside the frame structure. Among them, two ends of the crossbeam 200 are welded and fixed to two boundary beams 100, respectively. During the use of the casing of the battery in the related art, it is found that there is a problem of low connection strength at welds between each two adjacent boundary beams 100 and welds between the boundary beams 100 and the crossbeam 200, resulting in a low structural strength of the casing of the battery that cannot meet the requirement for the expansion force of the battery. In addition, the welding causes the significant thermal deformation of the boundary beams 100 and the crossbeam 200, so that it is difficult to improve the dimensional accuracy of the casing of the battery.

Therefore, the inventor attempts to arrange a support member 300 and a connecting member 400 to achieve the connection between the two boundary beams 100 and the connection between the boundary beams 100 and the crossbeam 200. Referring to FIG. 2, the support member 300 includes a plurality of sheet-like structures perpendicular to one another. At least one of the sheet-like structures is connected to an outer peripheral surface of an end or an outer side face of a middle portion of one of the boundary beams 100 through the connecting member 400, and at least one of the sheet-like structures is connected to an outer peripheral face of an end of another boundary beam 100 or an outer peripheral face of an end of the crossbeam 200 through the connecting member 400.

Figure 3:
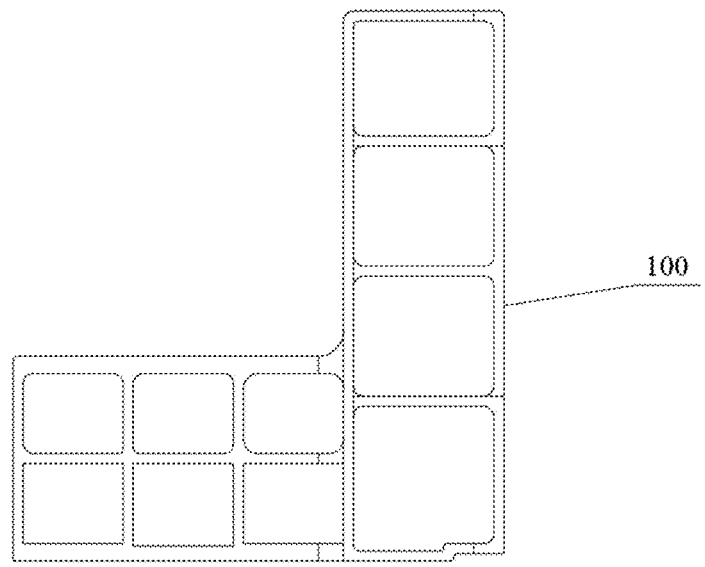
FIG. 3 shows a cross-sectional view of a boundary beam of a casing of a battery in a related art.

However, as shown in FIG. 3, the inventor finds that due to a surface of the boundary beam 100 being a flat plane and the support member 300 being connected to the surface of the boundary beam 100, the support member 300 occupies an internal space of the casing of the battery, which may reduce the utilization rate of the internal space of the casing of the battery. The connection between two boundary beams 100 or between the boundary beam 100 and the crossbeam 200 can be achieved by using the support member 300 and the connecting member 400. When subjected to an external force, the connecting member 400 can withstand the relatively large external force. Generally, the connecting member 400 is a bolt or rivet, which has a low structural strength. Therefore, the connection between the two boundary beams 100 and the connection between the boundary beams 100 and the crossbeam 200 by the support member 300 and the connecting member 400 still results in low connection strength between the two boundary beams 100 or between the two beams 100 and the crossbeam 200, which may lead to low structural strength of the casing of the battery.

In view of this, embodiments of the present application provide the casing of the battery, including a first beam, a second beam and a connecting assembly. A surface of the first beam is provided with a groove. The second beam is arranged on a side of the first beam provided with the groove. The first beam and the second beam are configured to define a space for accommodating a battery cell. The connecting assembly is configured to connect the first beam with the second beam, and at least a portion of the connecting assembly is arranged inside the first beam and the second beam. In the casing of the battery provided by the embodiments of the present application, the first beam and the second beam are connected through the connecting assembly, and at least a portion of the connecting assembly is arranged inside the first beam and the second beam and connects the first beam with the second beam. When subjected to an external force, the portion of the connecting assembly located inside the first beam and the second beam is entirely subjected to the force, so that it can withstand the relatively large external force. Furthermore, the first beam and the second beam provide the support for the connecting assembly by covering the portion of the connecting assembly inside the first beam and the second beam. The first beam and the second beam can share a portion of the external force onto the connecting assembly, so as to allow a connecting place between the first beam and the second beam to withstand a larger external force, improve the connection strength between the first beam and the second beam, and enhance the structural strength of the casing of the battery.

The casing of the battery described in the present embodiment is applied to the battery and an electricity-consuming apparatus.

The electricity-consuming apparatus may be a vehicle, a mobile phone, a portable device, a notebook computer, a ship, a spacecraft, an electric toy, an electric tool or the like. The vehicle may be a fuel car, a gas car or a new energy car, and the new energy car can be a pure electric car, a hybrid car, a range-extended car or the like; the spacecraft may include an airplane, a rocket, a space shuttle, a space ship or the like; the electric toy may include a fixed-type or mobile-type electric toy, such as a game player, an electric car toy, an electric ship toy, an electric airplane toy or the like; the power tool may include a metal cutting power tool, a grinding power tool, an assembly power tool and a railway power tools, such as an electric drill, an electric grinder, an electric wrench, an electric screwdriver, an electric hammer, an impact drill, a concrete vibrator, an electric planers or the like. Embodiments of the present application do not impose specific limitation to the above-mentioned electricity-consuming apparatus.

For the convenience of explanation, the following embodiments take a vehicle being as the electricity-consuming apparatus as an example to illustrate.

Figure 4:
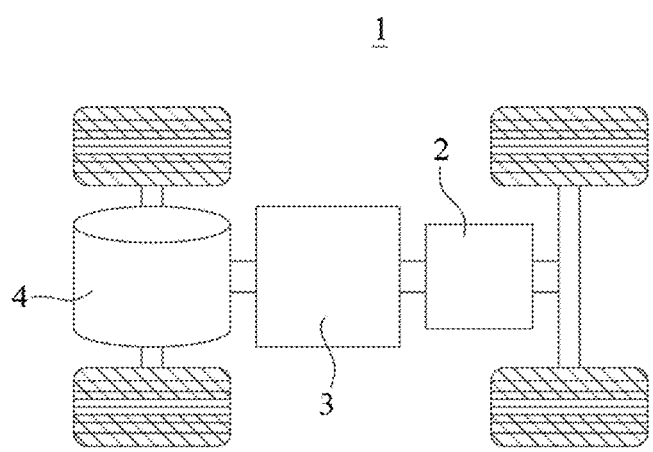
FIG. 4 shows a structural schematic view of a vehicle according to some embodiments of the present application.

FIG. 4 shows a structural schematic view of a vehicle according to some embodiments of the present application.

As shown in FIG. 4, a battery 2 may be arranged inside the vehicle 1, and the battery 2 may be arranged in the bottom, the front or the back of the vehicle 1. The battery 2 can be used to supply power to the vehicle 1, for example, the battery 2 can be used as an operating power source of the vehicle 1.

The vehicle 1 may further include a controller 3 and a motor 4, the controller 3 can be used to control the battery 2 to supply power to the motor 4, for example, for satisfying the work electricity needs of the vehicle 1 during starting, navigating and driving.

In some embodiments of the present application, the battery 2 can not only serve as an operating power source for the vehicle 1, but also as a driving power source for the vehicle 1, so as to replace or partially replace the fuel or the natural gas and provide the driving power for the vehicle 1.

Figure 5:
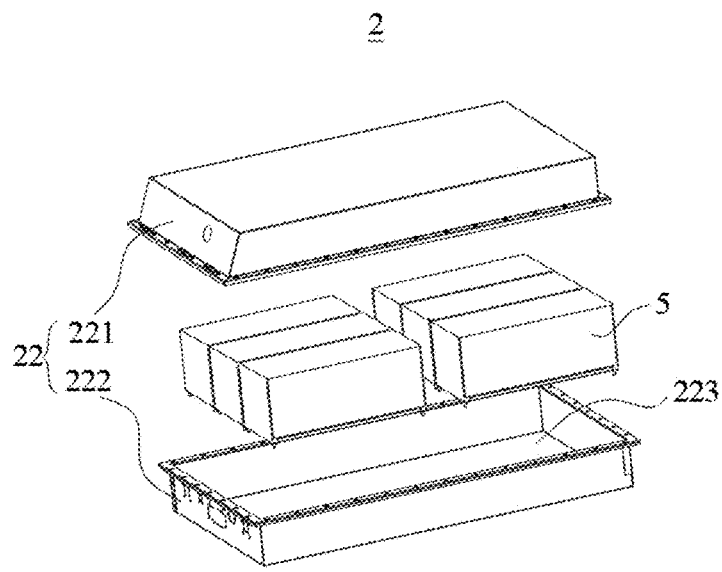
FIG. 5 shows an exploded schematic view of a battery according to some embodiments of the present application.

FIG. 5 shows an exploded schematic view of a battery according to some embodiments of the present application.

As shown in FIG. 5, the battery 2 includes a casing 22 and a battery cell (not shown in FIG. 2), and the battery cell is accommodated in the casing 22.

The casing 22 is used to accommodate the battery cell and may have various structures. In some embodiments, the casing 22 may include a first casing portion 221 and a second casing portion 222. The first casing portion 221 and the second casing portion 222 may cover with each other, and the first casing portion 221 and the second casing portion 222 jointly define an accommodating space 223 for accommodating the battery cell. The second casing portion 222 can be a hollow structure having an opening at an end, the first casing portion 221 can be a plate-shaped structure, and the first casing portion 221 may cover a side of the second casing portion 222 with the opening to form the casing 22 having the accommodating space 223. Or each of the first casing portion 221 and the second casing portion 222 can be the hollow structure having the opening at a side, and the side of the first casing portion 221 with the opening covers and closes to the side of the second casing portion 222 with the opening to form the casing 22 having the accommodating space 223. Of course, the first casing portion 221 and the second casing portion 222 can be in various shapes, such as a cylinder or a cuboid.

In order to improve the sealing performance after connecting the first casing portion 221 with the second casing portion 222, a sealing member, such as sealant or sealing ring, can be arranged between the first casing portion 221 and the second casing portion 222.

Assuming that the first casing portion 221 covers and closes a top of the second casing portion 222, the first casing portion 221 can be referred to as an upper casing cover, and the second casing portion 222 can be referred to as a lower casing body 22.

In the battery 2, there may be a plurality of battery cells. The plurality of battery cells can be connected in series, in parallel or in hybrid. The hybrid connection means that the plurality of battery cells may include the connection in series and the connection in parallel. The plurality of battery cells can be directly connected in series, in parallel or in hybrid together, and then the whole composed of the plurality of battery cells can be accommodated in the casing 22. Certainly, the battery 2 may be in form of the plurality of battery cells connected in series, in parallel or in hybrid to form a battery module 5 firstly, and then a plurality of battery modules are connected in series, in parallel or in hybrid to form a whole, and accommodated in the casing 22.

Figure 6:
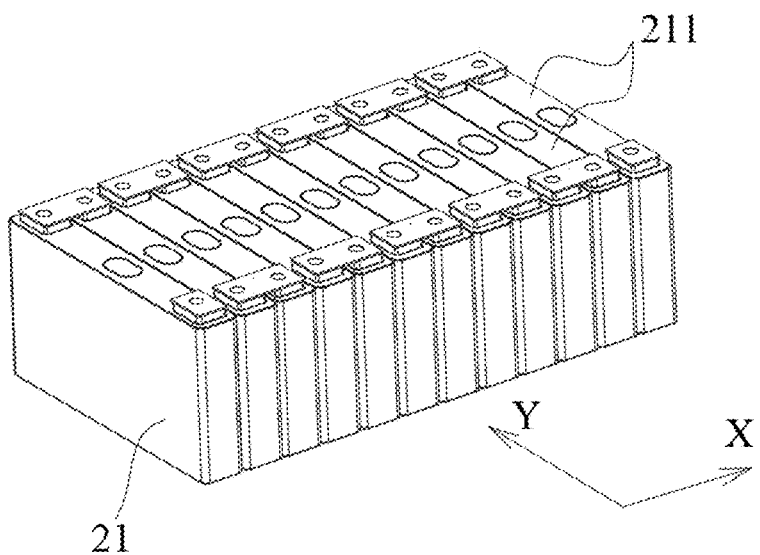
FIG. 6 shows a structural schematic view of a battery module according to some other embodiments of the present application.

FIG. 6 shows a structural schematic view of a battery module according to some other embodiments of the present application.

As shown in FIG. 6, in some embodiments, the battery 2 includes a battery unit 21, which includes a plurality of battery cells 211 arranged in sequence in an arrangement direction X.

There may be one or more battery units 21. For example, the battery 2 includes a plurality of battery units 21, which are arranged in a first direction Y. The first direction Y intersects with the arrangement direction X. Optionally, the first direction Y is perpendicular to the arrangement direction X.

The plurality of battery cells 211 in the battery 2 can be electrically connected through a busbar to achieve the connection of the plurality of battery cells 211 in battery 2 in parallel, in series or in hybrid.

Referring to the drawings, the casing of the battery in the embodiments of the present application will be described in detail.

Figure 7:
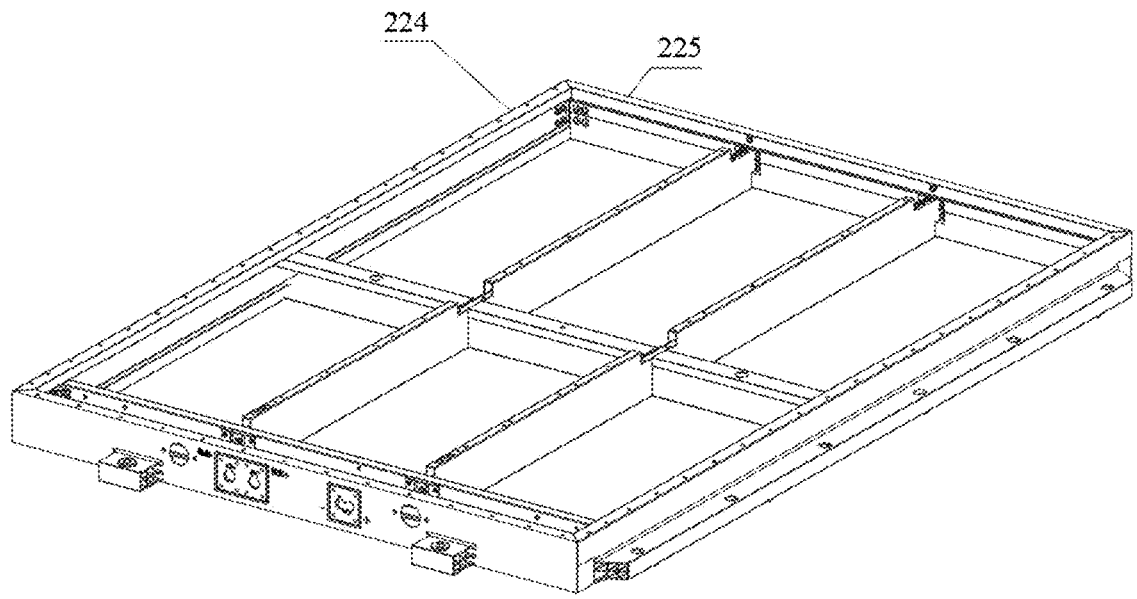
FIG. 7 shows a structural schematic view of a casing of a battery according to some embodiments of the present application.
Figure 8:
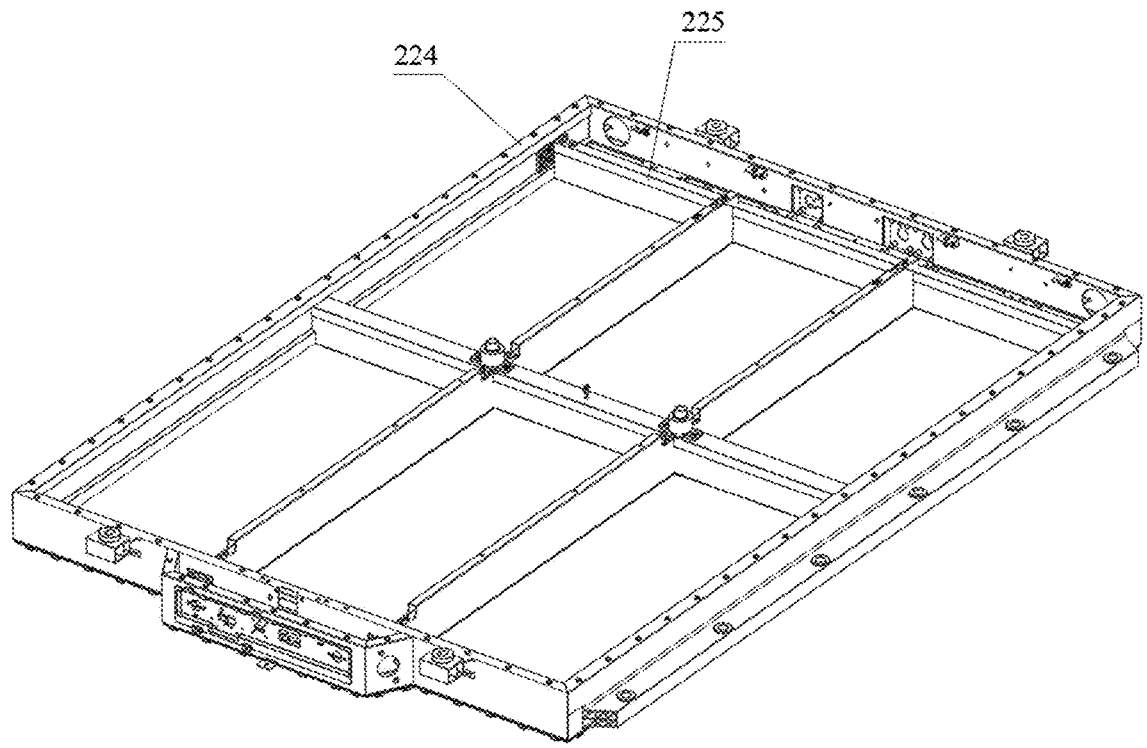
FIG. 8 shows a structural schematic view of a casing of a battery according to some embodiments of the present application.
Figure 9:
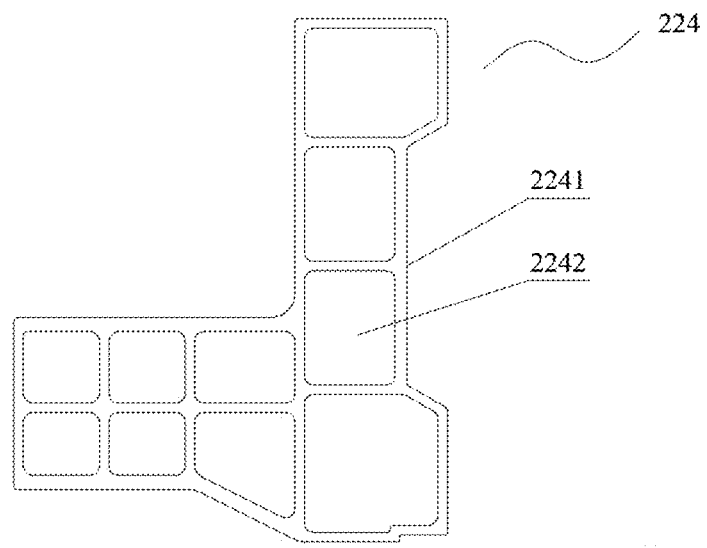
FIG. 9 shows a cross-sectional view of a first beam of a casing of a battery according to some embodiments of the present application.
Figure 10:
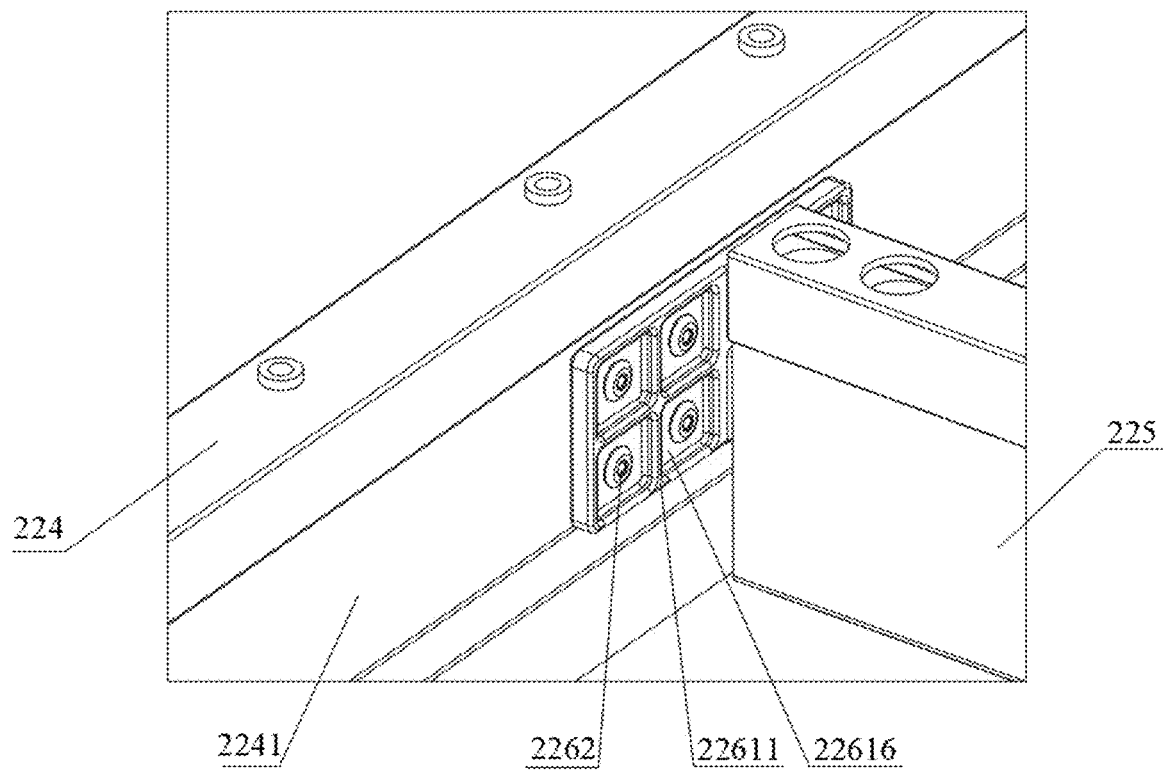
FIG. 10 shows a structural schematic view of a first beam and a second beam of a casing of a battery connected together according to some embodiments of the present application.
Figure 11:
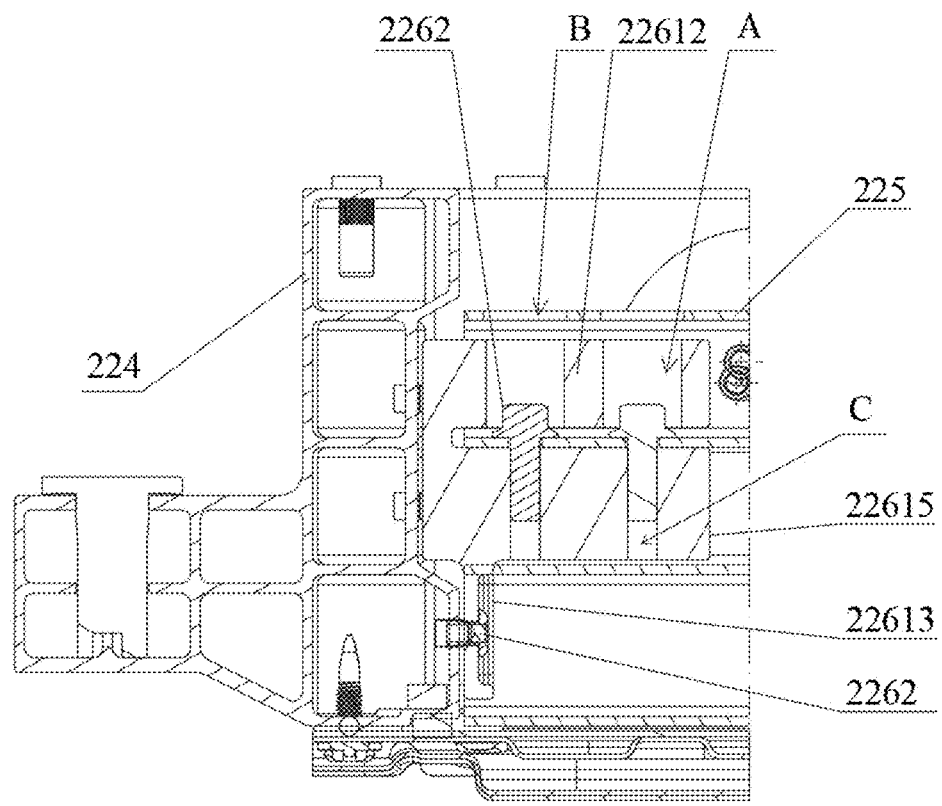
FIG. 11 shows a cross-sectional view of a first beam and a second beam of a casing of a battery connected together according to some embodiments of the present application.
Figure 12:
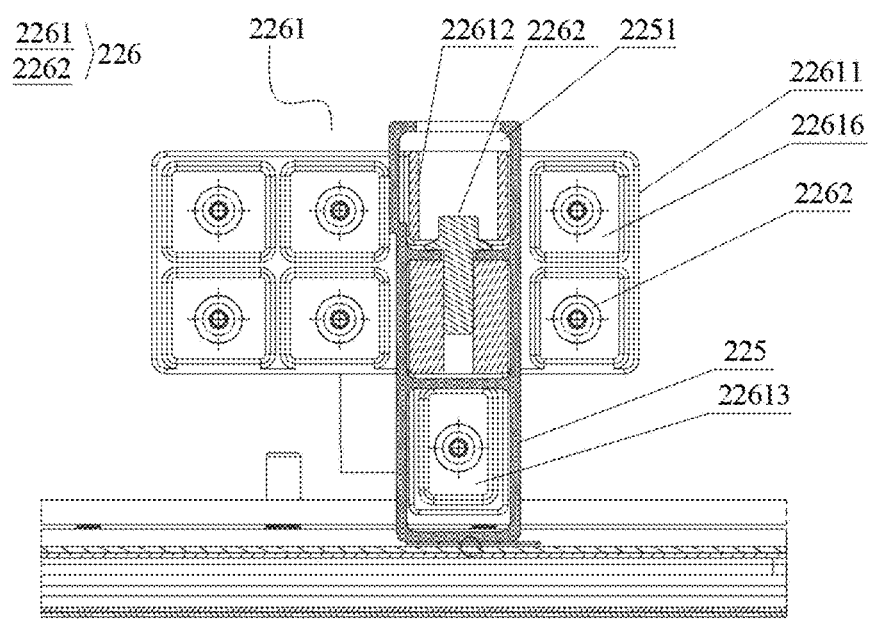
FIG. 12 shows a structural schematic view of a first beam and a second beam of a casing of a battery connected together in another perspective according to some embodiments of the present application.
Figure 13:
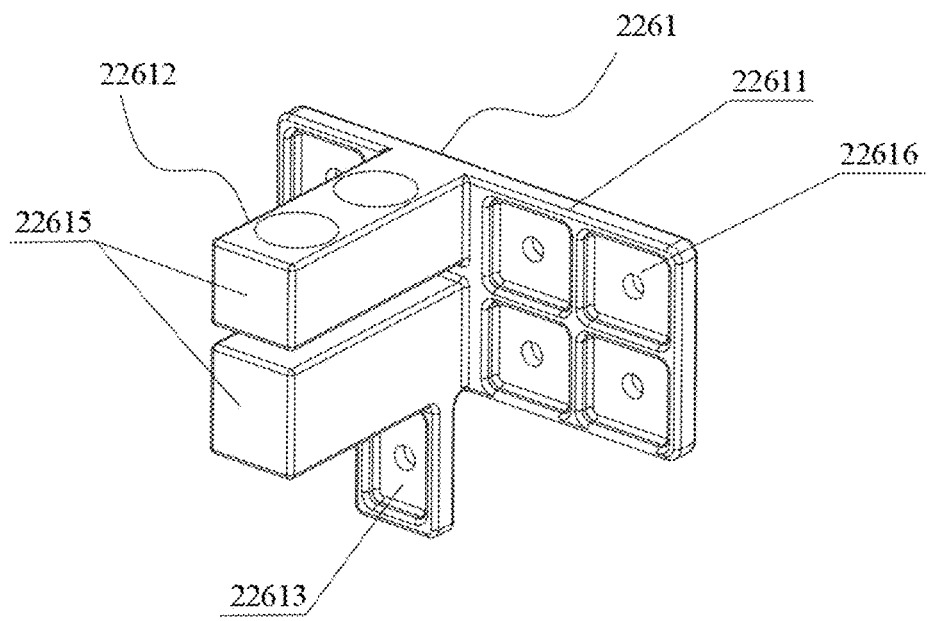
FIG. 13 shows a structural schematic view of a connecting assembly of a casing of a battery connected together according to some embodiments of the present application.
Figure 14:
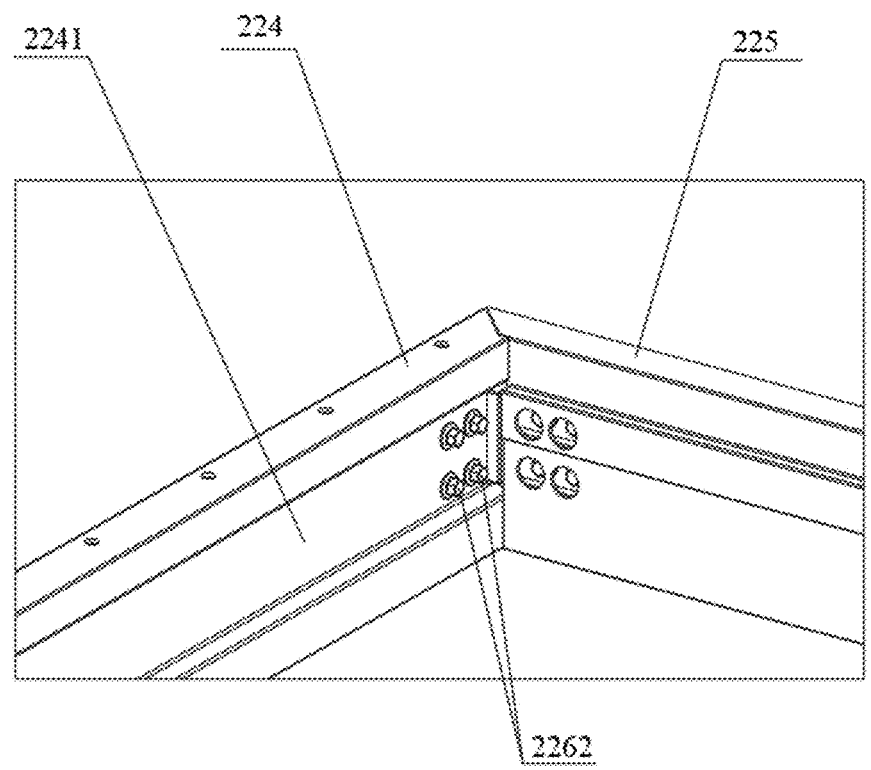
FIG. 14 shows a structural schematic view of a first beam and a second beam of a casing of a battery connected together according to some other embodiments of the present application.
Figure 15:
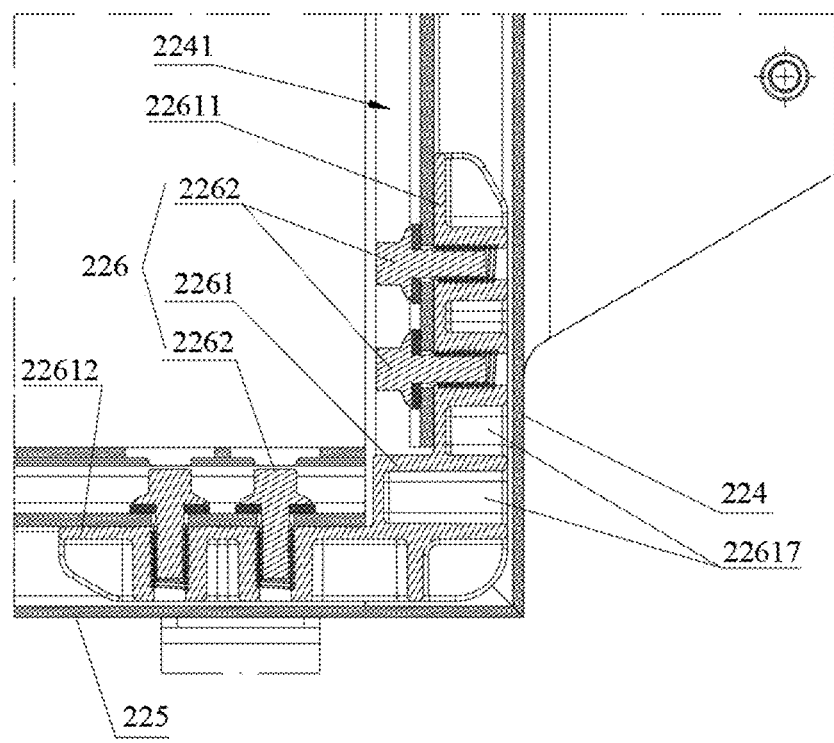
FIG. 15 shows a cross-sectional view of a first beam and a second beam of a casing of a battery connected together according to some other embodiments of the present application.
Figure 16:
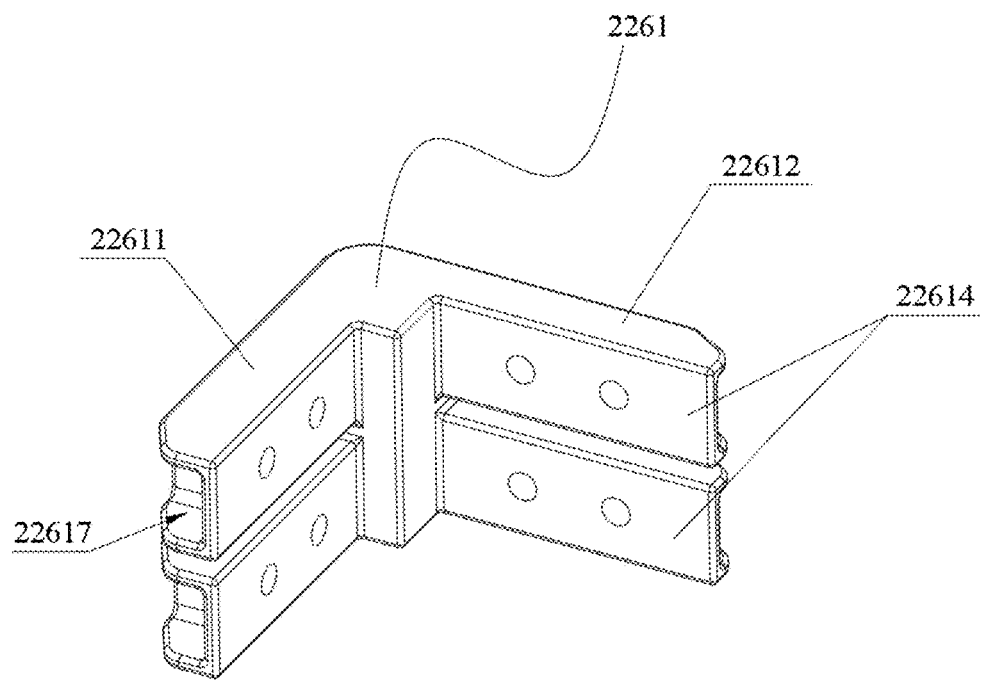
FIG. 16 shows a structural schematic view of a connecting assembly of a casing of a battery connected together according to some other embodiments of the present application.

FIG. 7 shows a structural schematic view of a casing of a battery according to some embodiments of the present application; FIG. 8 shows a structural schematic view of a casing of a battery according to some embodiments of the present application; FIG. 9 shows a cross-sectional view of a first beam of a casing of a battery according to some embodiments of the present application; FIG. 10 shows a structural schematic view of a first beam and a second beam of a casing of a battery connected together according to some embodiments of the present application; FIG. 11 shows a cross-sectional view of a first beam and a second beam of a casing of a battery connected together according to some embodiments of the present application; FIG. 12 shows a structural schematic view of a first beam and a second beam of a casing of a battery connected together in another perspective according to some embodiments of the present application; FIG. 13 shows a structural schematic view of a connecting assembly of a casing of a battery connected together according to some embodiments of the present application; FIG. 14 shows a structural schematic view of a first beam and a second beam of a casing of a battery connected together according to some other embodiments of the present application; FIG. 15 shows a cross-sectional view of a first beam and a second beam of a casing of a battery connected together according to some other embodiments of the present application; and FIG. 16 shows a structural schematic view of a connecting assembly of a casing of a battery connected together according to some other embodiments of the present application.

As shown in FIG. 7 to FIG. 16, embodiments of the present application provide a casing of a battery, including a first beam 224, a second beam 225 and a connecting assembly 226. A surface of the first beam 224 is provided with a groove 2241. The second beam 225 is arranged on a side of the first beam 224 provided with the groove 2241. The first beam 224 and the second beam 225 are configured to define a space for accommodating a battery cell. The connecting assembly 226 is configured to connect the first beam 224 with the second beam 225, and at least a portion of the connecting assembly 226 is arranged inside the first beam 224 and the second beam 225.

The groove 2241 is provided on the surface of the first beam 224 and extends in a length direction of the first beam 224. The connecting assembly 226 is fixed to the first beam 224 in the groove 2241. A plurality of shaped cavities 2242 are formed inside the first beam 224, and a plurality of shaped cavities 2251 are also formed inside the second beam 225. At least one of the shaped cavities 2242 is formed at a position corresponding to the groove 2241 inside the first beam 224. By providing the shaped cavities 2242 and the shaped cavities 2251, the structural strength of the first beam 224 and the second beam 225 can be ensured, and the lightweight of the first beam 224 and the second beam 225 can be achieved.

The groove can also be provided on a surface of the second beam 225 on a side facing the first beam 224, and the connecting assembly 226 can be fixed to the second beam 225 in the groove.

Herein, the first beam 224 may be a boundary beam, and the second beam 225 may be a boundary beam or a crossbeam. The connecting assembly 226 is connected to both of the first beam 224 and the second beam 225 to achieve the connection between two boundary beams or between the boundary beam and the crossbeam. The connecting assembly 226 may be, but not limited to, an irregular connecting member or a metric connecting member. A connection method for connecting assembly to the first beam 224 and the second beam 225 may include, but is not limited to, a movable connection or a fixed connection. A connection position between the connecting assembly 226 and the first beam 224 or between the connecting assembly 226 and the second beam 225 may include, but not limited to, an exterior of the first beam 224 and/or the second beam 225, an interior of the first beam 224 and/or the second beam 225, or an end or a middle portion of the first beam 224 and/or the second beam 225 in the length direction.

In the embodiments of the present application, the first beam 224 and the second beam 225 are connected through the connecting assembly 226, and at least a portion of the connecting assembly 226 is arranged inside the first beam 224 and the second beam 225 and connects the first beam 224 with the second beam 225. When subjected to an external force, the portion of the connecting assembly 226 located inside the first beam 224 and the second beam 225 is subjected to the force as a whole, so that it can withstand the relatively large external force. Furthermore, the first beam 224 and the second beam 225 provide the support for the connecting assembly 226 by covering the portion of the connecting assembly 226 inside the first beam 224 and the second beam 225. The first beam 224 and the second beam 225 can share a portion of the external force acting on the connecting assembly 226, so as to allow a connecting place between the first beam 224 and the second beam 225 to withstand a larger external force, improve the connection strength between the first beam 224 and the second beam 225, and enhance the structural strength of the casing of the battery.

As shown in FIG. 10 to FIG. 16, in some embodiments, the connecting assembly 226 includes a first connecting member 2261 and a second connecting member 2262. The first connecting member 2261 includes a first portion 22611 and a second portion 22612. The second portion 22612 extends from a surface of the first portion 22611 towards a direction away from the first portion 22611. The first portion 22611 is connected to the first beam 224 through the second connecting member 22612. At least a portion of the second connecting member 2262 is accommodated in the groove 2241. The second portion 22612 is connected to the second beam 225 through the second connecting member 2262.

The first portion 22611 can be arranged inside the first beam 224, and the first portion 22611 can be arranged in the groove 2241. Whether the first portion 22611 is arranged inside the first beam 224 or in the groove 2241, the first portion 22611 is fixed to the first beam 224 at the groove 2241 through the second connecting member 2262. After the first portion 22611 is connected to the first beam 224, one end of the second connecting member 2262 will be positioned in the groove 2241.

In the embodiments of the present application, the first portion 22611 of the first connecting member 2261 is arranged inside the first beam 224 or the groove 2241. The second connecting member 2262 penetrates through a bottom of the groove 2241 and positions the first portion 22611 inside the first beam 224 or inside a first groove 2241. The second portion 22612 is arranged inside the second beam 225. The second connecting member 2262 positions the second portion 22612 inside the second beam 225. A side wall of the first beam 224 or a groove wall and a bottom of the groove 2241 can cover and support the first portion 22611, and a side wall of the second beam 225 can cover and support the second portion 22612, so as to share the external force onto the first portion 22611 and second portion 22612.

As shown in FIG. 10 to FIG. 12, in some embodiments, the first portion 22611 is accommodated within the groove 2241, and fixed at the bottom of the groove 2241 through the second connecting member 2262.

The first beam 224 can be understood as the boundary beam, the second beam 225 can be understood as the crossbeam, and the first portion 22611 is arranged inside the groove 2241 at the middle portion of the boundary beam.

In the embodiments of the present application, the first portion 22611 is mounted and fixed in the groove 2241, which has the advantage of easy disassembly and assembly and is more suitable for the connection between the boundary beam and the crossbeam. In addition, by mounting and fixing the first portion 22611 inside the groove 2241, the space occupied by the first portion 22611 inside the casing of the battery can be at least partially reduced, the utilization rate of the casing of the battery can be improved.

As shown in FIG. 10 to FIG. 12, in some embodiments, the first portion 22611 is provided with a concave portion 22616 on a surface of the concave portion facing away from the first beam 224, and at least a portion of the second connecting member 2262 is accommodated within the concave portion 22616.

That is, at a place where a surface of the first portion 22611 on one side is connected with a bottom of the groove 2241, a surface of the first portion 22611 on the other side is recessed and provided with at least one concave portion 22616. The second connecting member 2262 is a bolt or a rivet. After the second connecting member 2262 penetrating through the first portion 22611 and connecting the first portion 22611 with the first beam 224, a bolt head or a rivet head of the second connecting member 2262 sinks into the concave portion 22616.

In the embodiments of the present application, by providing the concave portion 22616 on the surface of the first portion 22611 facing away from the first beam 224, the weight of the first portion 22611 can be reduced and the requirement of lightweight can be achieved. In addition, the accommodating space for the bolt head or the rivet head can be provided, thereby avoiding occupation of the internal space of the casing of the battery by the bolt head or the rivet head.

As shown in FIG. 10 to FIG. 13, in some embodiments, the second portion 22612 includes at least one connecting end 22615 for inserting into an interior of the corresponding second beam 225, and in a state of the second portion including a plurality of connecting ends 22615, the connecting ends 22615 are parallel with and spaced apart from one another.

When mounting the second portion 22612, the connecting ends 22615 of the second portion 22612 are inserted into the shaped cavities 2251 of the second beam 225, respectively. Specifically, as shown in FIG. 10 to FIG. 13, the second portion 22612 may include two connecting ends 22615, which are spaced apart from each other in an up-down direction. The upper connecting end 22615 is provided with an avoidance hole A, and the lower connecting end 22615 is provided with a connection hole C. The connection hole C is concentric with the avoidance hole A. During mounting, two connecting ends 22615 are inserted into two shaped cavities 2251 of the second beam 225, respectively. A top plate of the shaped cavity 2251 located above is provided with a through hole B. The plate between the two shaped cavities 2251 is inserted between the two connecting ends 22615. The second connecting member 2262 penetrates through the plate between the two shaped cavities 2251 and is connected to the connecting hole C on the lower connecting end 22615 after passing through the through hole B and the avoidance hole A. Thus, the connection between the second portion 22612 and the second beam 225 can be achieved. An end of the second connecting member 2262 is located in the avoidance hole, and does not protrude from the surface of the second beam 225, so as to avoid occupying the internal space of the casing of the battery.

In the embodiments of the present application, the second portion 22612 includes at least one connecting end 22615, which can be engaged with the second beam 225 with different shaped cavities 2251. When there are a plurality of connecting ends 22615, the connecting ends 22615 are inserted into a plurality of shaped cavities 2251 of the second beam 225, respectively, which can further increase the area of the second beam 225 covering the second portion 22612. In addition, each of the connecting ends 22615 needs to be connected to the second beam 225, so as to further improve the connection strength between the second beam 225 and the second portion 22612, improve the ability of the second portion 22612 withstanding the external force, and improve the connection strength between the first beam 224 and the second beam 225.

As shown in FIG. 10 to FIG. 13, in some embodiments, the first connecting member 2261 further includes a third portion 22613, which is connected to the second portion 22612 and configured to connect with a region excluding the groove 2241 on a surface of the first beam 224 on the side provided with the groove 2241.

The third portion 22613 is integrally formed on a side of the second portion 22612. The third portion 22613 is perpendicular to the second portion 22612, and the third portion 22613 is parallel with the first portion 22611. The third portion 22613 is also connected to the first beam 224 through the second connecting member 2262.

The third portion 22613 may be a sheet-like structure or a block structure, and a surface of third portion 22613 on a side facing away from the first beam 224 can also be provided with a concave portion. The concave portion provided on the third portion 22613 has the same structure as the concave portion 22616 provided on the first portion 22611. Thus, when the second connecting member 2262 connects the third connecting portion 22613 to the first beam 224, the end of the second connecting member 2262 can sink into the concave portion, so that the internal space occupied by the casing of the battery can be reduced.

In the embodiments of the present application, by connecting the third portion 22613 with the first beam 224, the connection strength between the first connecting member 2261 and the first beam 224 can be further improved, so that the connection strength between the first beam 224 and the second beam 225 can be improved.

As shown in FIG. 10, in some embodiments, a size of the first portion 22611 in a depth direction of the groove 2241 is less than or equal to a depth of the groove 2241.

That is, the first portion 22611 is fully accommodated in groove 2241 when is mounted in groove 2241.

In the embodiments of the present application, the first portion 22611 does not protrude from a groove opening of the groove 2241 when is arranged inside the groove, so as to avoid occupying an internal space of the casing of the battery.

As shown in FIG. 14 to FIG. 16, in some embodiments, the first portion 22611 is accommodated within the first beam 224, and the second connecting member 2262 passes through the bottom of the groove 2241 and is connected to the first portion 22611.

Both the first beam 224 and the second beam 225 can be understood as the boundary beams. The first portion 22611 and the second portion 22612 are inserted into the interiors of the first beam 224 and the second beam 225, respectively, so that the end of the first beam 224 and the end of the second beam 225 can be connected with each other.

In the embodiments of the present application, the first portion 22611 is mounted and fixed in the first beam 224. The connection strength between the first beam 224 and the first portion 22611 can be improved by the first beam 224 covering the first portion 22611, which is more suitable for the connection between the boundary beams.

As shown in FIG. 14 to FIG. 16, in some embodiments, each of the first portion 22611 and the second portion 22612 includes at least one inserting end 22614, which is configured to insert into an interior of the corresponding first beam 224 or second beam 225; in a state of the first portion 22611 including a plurality of inserting end 22614, the inserting ends 22614 of the first portion 22611 are parallel with and spaced apart from one another; and in a state the second portion 22612 including a plurality of inserting end 22614, the inserting ends 22614 of the second portion 22612 are parallel with and spaced apart from one another.

When mounting the first portion 22611 and the second portion 22612, the corresponding inserting ends 22614 of the first portion 22611 and the second portion 22612 are inserted into the shaped cavities 2242 of the first beam 224 and the shaped cavities 2251 of the second beam 225, respectively. Each of the first portion 22611 and the second portion 22612 can include two inserting ends 22614, which are spaced apart from each other in the up-down direction. The groove 2241 of the first beam 224 is correspondingly provided with two shaped cavities 2242, and the groove of the second beam 225 also is correspondingly provided with two shaped cavities 2251. The two inserting ends 22614 of the first portion 22611 are correspondingly inserted into the two shaped cavities 2242 of the first beam 224 corresponding to the position of the groove 2241, and the two inserting ends 22614 of the second portion 22612 are correspondingly inserted into the two shaped cavities 2251 of the second beam 225 corresponding to the position of the groove. A plurality of second connecting members 2262 are connected with the inserting ends 22614 of the first portion 22611 at the groove 2241 of the first beam 224 and the inserting ends 22614 of the second portion 22612 at the groove of the second beam 225, respectively. In this way, the connection between the first portion 22611 and the first beam 224 and the connection between the second portion 22612 and the second beam 225 can be achieved. All the ends of the second connecting member 2262 are located in the groove and will not protrude from the surfaces of the first beam 224 and the second beam 225, so as to avoid occupying the internal space of the casing of the battery.

In the above solution, each of the first portion 22611 and the second portion 22612 includes at least one inserting end 22614, which can be engaged with the first beam 224 provided with different shaped cavities 2242 and the second beam 225 provided with different shaped cavities 2251. When the first portion 22611 and the second portion 22612 each include a plurality of inserting ends 22614, the inserting ends 22614 are inserted into a plurality of shaped cavities of the first beam 224 and the second beam 225, respectively, which can further increase the area of the first beam 224 covering the first portion 22611 and the area of the second beam 22612 covering the second portion 225. In addition, the connecting ends 22614 need to be connected to the first beam 224 and the second beam 225 through the second connecting member 2262, respectively, so as to further improve the ability of the first portion 22611 and the second portion 22612 withstanding the external force, improve the connection strength between the first beam 224 and the first portion 22611 and between the second beam 225 and the second portion 22612, and improve the connection strength between the first beam 224 and the second beam 225.

As shown in FIG. 10 to FIG. 16, in some embodiments, the first connecting member 2261 is in a folding angular structure, and an angle formed between the first portion 22611 and the second portion 22612 is larger than 0° and less than 180°.

The angle between the first portion 22611 and the second portion 22612 can be determined based on the specific structure of the casing of the battery, which is generally a rectangular structure. Generally, therefore, the angle between the first portion 22611 and the second portion 22612 is 90°. However, it should be noted that the present application is not limited to this.

In some specific cases, for example, when two first beams 224 need to be connected in a straight line, the angle between the first portion 22611 and the second portion 22612 can be set to 180°, that is, the first connecting member 2261 is also in a straight line structure. The first portion 22611 and the second portion 22612 are inserted into the interiors of the two first beams 224, respectively, and fixed through the second connecting member 2262, so as to achieve the straight line connection of the two first beams 224.

In the embodiments of the present application, by selecting the first connecting members 2261 with different angles between the first portion 22611 and second portion 22612, the connections between the first beam 224 and the second beam 225 at different angles can be achieved.

As shown in FIG. 15 to FIG. 16, in some embodiments, the first connecting member 2261 is provided with a plurality of shaped recesses 22617 for reducing a weight of the first connecting member 2261.

A cross section of the shaped recess 22617 is a concave structure in a shape of rectangular, circular or other shape.

In the embodiments of the present application, by providing the shaped recesses 22617, the weight of the casing of the battery, the battery and the electricity-consuming apparatus can be effectively reduced, and the lightweight requirement can be achieved.

As shown in FIG. 7, in some embodiments, the casing includes two first beams 224 and two second beams 225, which are arranged alternately to form a frame structure. The first beam 224 and the second beam 225 which are adjacent are connected through the connecting assembly 226.

In the embodiments of the present application, both the first beam 224 and the second beam 225 can be understood as the boundary beams, and the first portion 22611 and second portion 22612 of the first connecting member 2261 are arranged inside the first beam 224 and the second beam 225, respectively.

As shown in FIG. 8, in some embodiments, the casing includes a plurality of first beams 224, which are sequentially connected to form a frame structure. The second beam 225 is arranged within the frame structure and connected to two first beams 224 through the connecting assembly 226.

In the embodiments of the present application, the first beam 224 can be understood as the boundary beam, and the second beam 225 can be understood as the crossbeam. The first portion 22611 of the first connecting member 2261 is arranged in the groove 2241 of the first beam 224, and the second portion 22612 of the first connecting member 2261 is arranged inside the second beam 225.

In some embodiments, the present application provides a battery including a battery cell and the casing of the battery according to any one of the solutions as described above. The casing of the battery is configured to accommodate the battery cell.

In the above solution, the first beam 224 and the second beam 225 of the casing of the battery are connected through the connecting assembly 226, and at least a portion of the connecting assembly 226 is arranged inside the first beam 224 and the second beam 225 and connects the first beam 224 with the second beam 225. When subjected to the external force, the portion of the connecting assembly 226 located inside the first beam 224 and the second beam 225 is subjected to the force as a whole, so that it can withstand the relatively large external force. Furthermore, the first beam 224 and the second beam 225 provide the support for the connecting assembly 226 by covering the portion of the connecting assembly 226 inside the first beam 224 and the second beam 224. The first beam 224 and the second beam 225 can share a portion of the external force onto the connecting assembly 226 so as to allow the connection between the first beam 224 and the second beam 225 to withstand a larger external force, improving the connection strength between the first beam 224 and the second beam 225, and thus improving the structural strength of the casing of the battery and the battery.

In some embodiments, the present application provides an electricity-consuming apparatus, which includes the battery according to any one of the embodiments as described above. The battery is configured to supply electric power.

In the above solution, the first beam 224 and the second beam 225 of the casing of the battery are connected through the connecting assembly 226, and at least a portion of the connecting assembly 226 is arranged inside the first beam 224 and the second beam 225 and connects the first beam 224 with the second beam 225. When subjected to the external force, the portion of the connecting assembly 226 located inside the first beam 224 and the second beam 225 is subjected to the force as a whole, so that it can withstand the relatively large external force. Furthermore, the first beam 224 and the second beam 225 provide the support for the connecting assembly 226 by covering the portion of the connecting assembly 226 inside the first beam 224 and the second beam 224. The first beam 224 and the second beam 225 can share a portion of the external force onto the connecting assembly 226 so as to allow a connecting place between the first beam 224 and the second beam 225 to withstand a larger external force, improving the connection strength between the first beam 224 and the second beam 225, and thus improving the structural strength of the casing of the battery, the battery and the electricity-consuming apparatus.

The electricity-consuming apparatus may be any one of the devices or systems applying the battery as described above.

In some embodiments, as shown in FIG. 9 to FIG. 16, the present application provides the casing of the battery including a plurality of first beams 224 and a plurality of second beams 225. The plurality of first beams 224 are all boundary beams and are connected with one another to enclose and form a frame-like structure. The surface of each of first beams 224 facing an inner side of the frame-like structure is recessed and provided with a groove 2241. The plurality of second beams 225 are all crossbeams. Two ends of each of the second beams 225 are connected with a pair of first beams 224 opposite to each other, respectively. Each two connected first beams 224 are connected through a connecting assembly 226, and the connected first beam and second beam 224 are connected through the connecting assembly 226. The connecting assembly 226 includes a first connecting member 2261 and a second connecting member 2262. The first connecting member 2261 includes a first portion 22611 and a second portion 22612. When two connected first beams 224 are connected through the connecting assembly 226, the first portion 22611 and the second portion 22612 of the first connecting member 2261 are inserted into interiors of these two first beams 224, respectively. The first portion 22611 and the second portion 22612 are connected to the two first beams 224 at the groove 2241 through the second connecting member 2262, respectively. When two connected beams which are the first beam 224 and the second beam 225 are connected through the connecting assembly 226, the first portion 22611 of the first connecting member 2261 is located in the groove 2241 of the first beam 224 and is connected to the first beam 224 through the second connecting member 2262. The second portion 22612 of the first connecting member 2261 is inserted into the interior of the second beam 225 and connected to the second beam 225 through the second connecting member 2262.

In the present embodiments, both the first portion 22611 and the second portion 22612 of the connecting assembly 226 are arranged inside the first beam 224 and the second beam 225, or inside the groove 2241 of the first beam 224 and inside the second beam 225. When subjected to the external force, the first portion 22611 and the second portion 22612 of the connecting assembly 226 are subjected to the force as a whole and can withstand the relatively large external force. Furthermore, the first beam 224 or the groove 2241 on the first beam 224 and the second beam 225 covering the first portion 22611 and the second portion 22612 can provide the support for the first portion 22611 and the second portion 22612. The first beam 224, the second beam 225 and the connecting assembly 226 can share the external force together, so that the connection place between the first beam 224 and the second beam 225 can withstand a larger external force, the connection strength between the first beam 224 and the second beam 225 can be improved, and the structural strength of the casing of the battery can be improved.

It should be noted that, without conflict, the embodiments of the present application and the features in the embodiments can be combined with one another.

At last, it should be noted that the above embodiments are only used to illustrate the technical solutions of the present application, but not to limit the technical solutions; although the present application has been described in detail with reference to the embodiments as described above, those skilled in the art should understand that: it is still possible to modify the technical solutions recited in the embodiments as described above, or equivalently replace some of the technical features, but these modifications or replacements do not cause the essence of the corresponding technical solutions to deviate from the gist and scope of the technical solutions of the embodiments of the present application.

What is claimed is:

1. A casing of a battery comprising:
    a first beam, provided with a groove on its surface;
    a second beam, arranged on a side of the first beam provided with the groove, and the first beam and the second beam being configured to define a space for accommodating a battery cell; and
    a connecting assembly, configured to connect the first beam with the second beam, and at least a portion of the connecting assembly being arranged inside the first beam and the second beam, wherein
    the connecting assembly comprises a first connecting member and a second connecting member, the first connecting member comprising a first portion and a second portion, and the second portion extending from a surface of the first portion towards a direction away from the first portion;
    the first portion is connected to the first beam through the second connecting member, at least a portion of the second connecting member is accommodated in the groove, and the second portion is connected to the second beam through the second connecting member;
    the first portion is accommodated within the groove, and fixed at a bottom of the groove through the second connecting member; and
    the first connecting member further comprising a third portion, which is connected to the second portion and configured to connect with a region other than the groove on the surface of the first beam provided with the groove.

2. The casing according to claim 1, wherein the first portion is provided with a concave portion on a surface of the first portion facing away from the first beam, and at least a portion of the second connecting member is accommodated within the concave portion.

3. The casing according to claim 1, wherein the second portion comprises at least one connecting end for inserting into an interior of the corresponding second beam, and in a state of the second portion comprising a plurality of connecting ends, the connecting ends are parallel with and spaced apart from one another.

4. The casing according to claim 1, wherein a size of the first portion in a depth direction of the groove is less than or equal to a depth of the groove.

5. The casing according to claim 1, wherein the first portion is accommodated within the first beam, and the second connecting member passes through the bottom of the groove and is connected to the first portion.

6. The casing according to claim 5, wherein each of the first portion and the second portion comprises at least one inserting end configured to insert into an interior of the corresponding first beam or second beam; in a state of the first portion comprising a plurality of inserting ends, the inserting ends of the first portion are parallel with and spaced apart from one another; and in a state the second portion comprising a plurality of inserting ends, the inserting ends of the second portion are parallel with and spaced apart from one another.

7. The casing according to claim 5, wherein the first connecting member is in a folding angular structure, and an angle formed between the first portion and the second portion is larger than 0° and less than 180°.

8. The casing according to claim 5, wherein the first connecting member is provided with a plurality of shaped recesses for reducing a weight of the first connecting member.

9. The casing according to claim 1, further comprising two first beams and two second beams, which are arranged alternately to form a frame structure; and
    the first beam and the second beam which are adjacent are connected through the connecting assembly.

10. The casing according to claim 1, further comprising a plurality of first beams, which are sequentially connected to form a frame structure; and
    the second beam is arranged within the frame structure and connected to two first beams through the connecting assembly.

11. A battery, comprising:
    a battery cell and a casing configured to accommodate the battery cell, the casing comprising:
    a first beam, provided with a groove on its surface;
    a second beam, arranged on a side of the first beam provided with the groove, and the first beam and the second beam being configured to define a space for accommodating the battery cell; and
    a connecting assembly, configured to connect the first beam with the second beam, and at least a portion of the connecting assembly being arranged inside the first beam and the second beam, wherein
    the connecting assembly comprises a first connecting member and a second connecting member, the first connecting member comprising a first portion and a second portion, and the second portion extending from a surface of the first portion towards a direction away from the first portion;
    the first portion is connected to the first beam through the second connecting member, at least a portion of the second connecting member is accommodated in the groove, and the second portion is connected to the second beam through the second connecting member;
    the first portion is accommodated within the groove, and fixed at a bottom of the groove through the second connecting member; and
    the first connecting member further comprising a third portion, which is connected to the second portion and configured to connect with a region other than the groove on the surface of the first beam provided with the groove.

12. The battery according to claim 11, wherein the first portion is provided with a concave portion on a surface of the first portion facing away from the first beam, and at least a portion of the second connecting member is accommodated within the concave portion.

13. The battery according to claim 11, wherein the second portion comprises at least one connecting end for inserting into an interior of the corresponding second beam, and in a state of the second portion comprising a plurality of connecting ends, the connecting ends are parallel with and spaced apart from one another.

14. The battery according to claim 11, wherein a size of the first portion in a depth direction of the groove is less than or equal to a depth of the groove.

15. The battery according to claim 11, wherein the first portion is accommodated within the first beam, and the second connecting member passes through the bottom of the groove and is connected to the first portion.

16. The battery according to claim 15, wherein each of the first portion and the second portion comprises at least one inserting end configured to insert into an interior of the corresponding first beam or second beam; in a state of the first portion comprising a plurality of inserting ends, the inserting ends of the first portion are parallel with and spaced apart from one another; and in a state the second portion comprising a plurality of inserting ends, the inserting ends of the second portion are parallel with and spaced apart from one another.

17. The battery according to claim 15, wherein the first connecting member is in a folding angular structure, and an angle formed between the first portion and the second portion is larger than 0° and less than 180°.

18. The battery according to claim 15, wherein the first connecting member is provided with a plurality of shaped recesses for reducing a weight of the first connecting member.

19. The battery according to claim 11, comprising two first beams and two second beams, which are arranged alternately to form a frame structure; and
   the first beam and the second beam which are adjacent are connected through the connecting assembly.

20. An electricity-consuming apparatus, comprising:
   a battery configured to supply electric power to the electricity-consuming apparatus, the battery comprising:
   a battery cell and a casing configured to accommodate the battery cell, the casing comprising:
      a first beam, provided with a groove on its surface;
      a second beam, arranged on a side of the first beam provided with the groove, and the first beam and the second beam being configured to define a space for accommodating the battery cell; and
   a connecting assembly, configured to connect the first beam with the second beam, and at least a portion of the connecting assembly being arranged inside the first beam and the second beam, wherein
   the connecting assembly comprises a first connecting member and a second connecting member, the first connecting member comprising a first portion and a second portion, and the second portion extending from a surface of the first portion towards a direction away from the first portion;
   the first portion is connected to the first beam through the second connecting member, at least a portion of the second connecting member is accommodated in the groove, and the second portion is connected to the second beam through the second connecting member;
   the first portion is accommodated within the groove, and fixed at a bottom of the groove through the second connecting member; and
   the first connecting member further comprising a third portion, which is connected to the second portion and configured to connect with a region other than the groove on the surface of the first beam provided with the groove.

* * * * *